US010677226B2

(12) United States Patent
Soerensen

(10) Patent No.: US 10,677,226 B2
(45) Date of Patent: Jun. 9, 2020

(54) COOLING A WIND TURBINE GENERATOR

(71) Applicant: SIEMENS AKTIENGESELLSCHAFT, München (DE)

(72) Inventor: Peter Hessellund Soerensen, Brædstrup (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 0 days.

(21) Appl. No.: 16/337,772

(22) PCT Filed: Sep. 15, 2017

(86) PCT No.: PCT/EP2017/073331
§ 371 (c)(1),
(2) Date: Mar. 28, 2019

(87) PCT Pub. No.: WO2018/059974
PCT Pub. Date: Apr. 5, 2018

(65) Prior Publication Data
US 2020/0003187 A1     Jan. 2, 2020

(30) Foreign Application Priority Data
Sep. 30, 2016   (DE) .................. 10 2016 218 963

(51) Int. Cl.
*F03D 80/60*        (2016.01)
*H02K 5/20*         (2006.01)
(Continued)

(52) U.S. Cl.
CPC ............... *F03D 80/60* (2016.05); *H02K 5/20* (2013.01); *H02K 7/1838* (2013.01); *H02K 9/18* (2013.01); *H02K 9/26* (2013.01); *F05B 2260/232* (2013.01)

(58) Field of Classification Search
CPC ........ F03D 80/60; H02K 5/20; H02K 7/1838; H02K 9/18; H02K 9/26
(Continued)

(56) References Cited

U.S. PATENT DOCUMENTS

2010/0061853 A1* 3/2010 Bagepalli ............. H02K 7/1823
416/95
2010/0140952 A1* 6/2010 Jansen ...................... H02K 9/14
290/55
(Continued)

FOREIGN PATENT DOCUMENTS

CN         105927484 A    9/2016
EP          2320081 A2    5/2011
(Continued)

OTHER PUBLICATIONS

PCT International Search Report and Written Opinion of International Searching Authority dated Dec. 19, 2017 corresponding to PCT International Application No. PCT/EP2017/073331 filed Sep. 15, 2017.

*Primary Examiner* — Viet P Nguyen
(74) *Attorney, Agent, or Firm* — Henry M. Feiereisen LLC

(57) ABSTRACT

Cooling a wind turbine generator It is described an arrangement (100, 200) for cooling a generator mounted in a nacelle of a wind turbine, the arrangement comprising: a cooling air inlet (105) at an outer wall (1β7) of the nacelle (103) for introducing cooling air (109) into a space region (111) inside the nacelle; an inlet fan (113) downstream the cooling air inlet (105) configured to pressurize the introduced cooling air within the space region (111); a filter system (115) downstream the inlet fan (113) and separating the space region (111) from another space region (117) inside the nacelle (103), the other space (117) region being in communication with generator portions (119) to be cooled; a duct system (129) adapted to guide a portion (130) of cooling air (132) heated by exchange of heat from the generator portions to the cooling air into the space region (111).

22 Claims, 3 Drawing Sheets

(51) Int. Cl.
*H02K 7/18* (2006.01)
*H02K 9/18* (2006.01)
*H02K 9/26* (2006.01)

(58) Field of Classification Search
USPC .................................................. 290/44, 55
See application file for complete search history.

(56) References Cited

U.S. PATENT DOCUMENTS

| | | |
|---|---|---|
| 2011/0221204 A1 | 9/2011 | Kim et al. |
| 2012/0156053 A1* | 6/2012 | Stiesdal ............... F03D 80/60 |
| | | 416/93 R |
| 2013/0049371 A1 | 2/2013 | Stein et al. |
| 2014/0346781 A1* | 11/2014 | Airoldi ............... H02K 7/1838 |
| | | 290/1 B |
| 2015/0108756 A1* | 4/2015 | Li ........................... H02K 9/04 |
| | | 290/44 |
| 2015/0372566 A1* | 12/2015 | Airoldi ................. H02K 9/04 |
| | | 290/55 |
| 2018/0038351 A1* | 2/2018 | Jacobsen ................ H02K 9/26 |

FOREIGN PATENT DOCUMENTS

| | | |
|---|---|---|
| EP | 2 466 128 A1 | 6/2012 |
| EP | 2 743 502 A1 | 6/2014 |
| EP | 2 806 542 A1 | 11/2014 |

\* cited by examiner

COOLING A WIND TURBINE GENERATOR

CROSS-REFERENCES TO RELATED APPLICATIONS

This application is the U.S. National Stage of International Application No. PCT/EP2017/073331 filed Sep. 15, 2017, which designated the United States and has been published as International Publication No. WO 2018/059974 and which claims the priority of German Patent Application, Serial No, 10 2016 218 963.8, filed Sep. 30, 2016, pursuant to 35 U.S.C. 119(a)-(d).

FIELD OF INVENTION

The present invention relates to an arrangement and to a method for cooling a generator mounted in a nacelle of a wind turbine. Further, the present invention relates to a wind turbine having a nacelle, a generator and the control arrangement.

ART BACKGROUND

A wind turbine generator may be mounted in a nacelle which is mounted on top of a wind turbine tower. In the nacelle, a rotor shaft at which plural rotor blades are connected may be supported and the rotor shaft may be mechanically connected to a generator rotor which may comprise plural permanent magnets and which may rotate relative to a stator portion of the generator mounted within the nacelle. During operation of the generator, voltages and currents may be induced in the stator winding due to an induction effect which is caused by the rotation of the permanent magnets relative to stator windings. Thereby, during operation of the generator, the temperature of the generator may increase. Therefore, typically, during operation of the generator it is necessary to cool the generator, in particular a direct drive generator in which the generator rotor is directly connected to the rotor shaft of the wind turbine, at which the plural rotor blades are mounted.

Conventionally, a liquid link system may be used, in order to cool a direct drive wind turbine, in particular a direct drive generator. However, when using a liquid link system, the cooling air temperatures may be approximately 20 degrees higher than when using a direct cooled generator or using a direct cooling system. Further, the liquid link system may be relatively complicated and expensive.

A direct cooling system may be less expensive than a liquid link cooling system. Reducing the temperature of the generator may enable to increase the torque generated by the wind up to 5%. The advantage of the liquid link system may be that little air is exchanged with the surroundings, thus reducing the corrosion levels in the generator. With the liquid link it may also be easier to keep the humidity at a level which is relatively low. Summarizing, a liquid link system may give little dirt entering the generator and low humidity for reduced corrosion issues.

The conventional direct cooling systems have some disadvantages, in particular regarding reliability of the operation of the generator or reliability and safety of the operation of the cooling system.

Thus, there may be a need for an arrangement and a method for cooling a generator mounted in a nacelle of a wind turbine, which is reliable, safe and may ensure a proper operation for a relatively long time, thus reducing maintenance efforts and costs.

This need may be solved with the subject-matter of the independent claims.

SUMMARY OF THE INVENTION

This need may be met by the subject matter according to the independent claims. Advantageous embodiments of the present invention are described by the dependent claims.

According to an embodiment of the present invention it is provided an arrangement for cooling a generator mounted in a nacelle of a wind turbine, the arrangement comprising a cooling air inlet at an outer wall of the nacelle for introducing cooling air into a space region inside the nacelle, an inlet fan downstream the cooling air inlet configured to pressurize the introduced cooling air within the space region, a filter system downstream the inlet fan and separating the space region from another space region inside the nacelle, the other space region being in communication with generator portions to be cooled, (in particular a system for exchanging a portion of a heat energy from the generator portions to the cooling air to obtain heated cooling air), and a duct system adapted to guide a portion of cooling air heated by exchange of heat from the generator portions to the cooling air into the space region.

The cooling air inlet may for example be arranged at a bottom wall of the nacelle or at a top wall of the nacelle. In other embodiments, the cooling air inlet may be arranged at a back face of the nacelle. According to other embodiments, the cooling air inlets may comprise one or more openings at different faces of the outer wall of the nacelle. Via the cooling air inlet, surrounding cooling air may be introduced into the space region, also referred to as low humidity filter room in the following. The space region may be separated by in particular parts of the filter system and/or some internal wall sections from other space regions within the nacelle. Within the space region, the cooling air introduced via the cooling air inlet may be, according to embodiments of the present invention, reduced in humidity by advantageously mixing the cooling air with a portion of exhaust air, i.e. cooling air which has been heated by heat exchange with components of the generator.

The inlet fan may comprise for example an electric motor and blades which are mounted on a fan shaft which rotates driven by the electric motor. The inlet fan may suck ambient air from outside the nacelle into the space region and may pressurize the air it into the space region, for example to a pressure above the ambient pressure, in particular a pressure between 0 and 1000 Pa, Other pressurizing values may be possible. This pressure needs to be high enough to overcome the filter pressure loss and to pressurize the nacelle to prevent unfiltered air from leaking into the nacelle. The pressure loss on the filters may be typically between 50 and 300 Pa (1 Bar is 101325 Pa) In addition, the pressure in the nacelle may be the pressure in the space region diminished by the pressure loss. E.g., if the pressure in the space region is 900 Pa and the pressure loss is 200 Pa, the pressure in the nacelle may be 700 Pa. The pressure in the nacelle may be kept between 20 and 500 Pa above ambient pressure.

For avoiding that the pressurized cooling air introduced into the space region leaves the space region, the arrangement may further comprise an inlet valve which may prohibit exhaust of the cooling air from the space region to the outside but which may allow introduction of the cooling air from the outside into the space region.

The filter system may comprise one or more filters, in particular particle filters, for filtering solid particles, which may be present in the environment, from reaching components within the nacelle, in particular from reaching the generator portions to be cooled. In particular, the filter system (and optionally some internal wall sections) may be adapted or arranged such that all air which is introduced into the other space region has passed through active filter regions of the filter system. Thereby, it can be avoided to introduce dirty air containing dust and/or particles into the other space region.

The filtered cooling air may exchange heat with the generator portions, thereby carrying away a portion of a heat energy generated by the generator portions, in order to obtain heated cooling air.

The duct system may comprise one or more pipe sections or pipes which may be configured to guide the heated cooling air. Primarily, the duct system may comprise an exhaust pipe or exhaust duct running within the nacelle from the generator portion to be cooled towards an exhaust exit at an outer surface of the nacelle.

By guiding a portion of the cooling air which is heated by exchange of heat from the generator portions into the space region, the cooling air introduced via the cooling air inlet into the space region may be (slightly) heated up. Thereby, the relative humidity of the combined cooling air present within the space region may be reduced. The reduction of the relative humidity may reduce the amount of salt solved or dissolved within the cooling air. The reduction of the relative humidity may transform liquefied salt particles in the air by drying the droplets creating solid salt particles. Thus, salt may dry out, thereby forming solid salt particles. The solid salt particles may effectively be filtered out by the filter system. Further, the filter system may be deteriorated to a smaller extent compared to conventional system conveying relatively wet cooling air through a filter.

Thereby, it may be ensured to cool the generator portions with clean air containing relatively low amounts of dissolved salt. Therefore, corrosion problems of portions of the generator, such as stator portions and/or rotor portions, may be reduced.

According to an embodiment of the present invention, the duct system comprises an exhaust duct for guiding another portion of the heated cooling air to an outside of the nacelle, and a bypass duct arranged to provide a communication between the exhaust duct and the space region such that cooling air introduced into the space region combines with the portion of the heated cooling air guided through the bypass and the combined air passes through the inlet fan.

The exhaust duct may substantially be or comprise a straight pipe running for example in a longitudinal direction of the nacelle. The exhaust duct may guide the heated cooling air coming from the generator portion away from the generator and in a direction towards a back of the nacelle. The bypass duct may be coupled to the exhaust duct and may guide the portion of the heated cooling duct from the exhaust duct to the space region. Thereby, a combination of the cooling air introduced via the cooling air inlet and the portion of the heated cooling air may be present within the space region. Thereby, the temperature of the combined air may be higher than the temperature of the cooling air introduced via the cooling air inlet. Thus, the relative humidity of the combined air may be lower than the relative humidity of the cooling air introduced via the cooling air inlet.

According to an embodiment of the present invention, the inlet fan is configured to mix the portion of the heated cooling air with the cooling air introduced via the cooling air inlet.

The combined air may be passed through or traverse the inlet fan which may lead to an effective mixing of the portion of the heated cooling air with the cooling air introduced via the cooling air inlet. Therefore, a homogeneous temperature may be achieved in the mixed air, and the humidity of the mixed air may be homogeneously lowered, in order to dry out salt which is previously dissolved in the cooling air as introduced via the cooling air inlet. The dried out salt may effectively be filtered out by the filter system.

According to an embodiment of the present invention, the arrangement further comprises a valve installed in the bypass duct and controllable to adjust a valve opening, in order to adjust a magnitude of the portion of the heated cooling air guided into the space region.

By adjusting the valve opening, an amount of heated cooling air may be adjusted, in order to achieve a desired or predetermined humidity of the combined air. Thereby, the filtering may be performed efficiently.

According to an embodiment of the present invention, the arrangement further comprises a humidity sensor adapted to measure a humidity of air present within the space region, an actuator adapted to adjust the valve opening, and a valve controller adapted to generate a driving signal for the actuator based on the measured humidity and a predetermined humidity, being in particular between 50% and 70%.

The valve controller may for example be configured to determine and accordingly adjust the degree of the valve opening in order to achieve a predetermined humidity of the mixed air within the space region. For example, the temperature of the surrounding air and the humidity of the surrounding air may be measured and also the temperature of the heated air may be measured. By considering the volume of the space region and a particular mass flow of the heated cooling air through the bypass duct into the space region may enable to determine a valve opening which would introduce a sufficient amount of the heated cooling air, in order to achieve the predetermined humidity of the mixed air within the space region.

Thereby, an effective drying out of salt dissolved in the cooling air introduced via the cooling air inlet may be achieved. Thereby, the filtering process may effectively be performed.

According to an embodiment of the present invention, the exhaust duct runs in a longitudinal direction of the nacelle. In particular, the exhaust duct may run in a center region of the nacelle.

In particular, the cooling air may be led or guided in radially outer regions of the generator over the generator portions to be cooled and may then be led radially inwards towards the exhaust duct. Thereby, only one exhaust duct or exhaust pipe may be sufficient for effectively conveying away the heated cooling air which has acquired a portion of the heat generated in the generator.

According to an embodiment of the present invention, the arrangement further comprises an exhaust fan configured to generate a pressure in the exhaust duct which is lower than around the portions of the generator.

The exhaust fan, when in operation, may therefore effectively suck the heated cooling air away from the portions of the generator and through the exhaust duct. The exhaust fan may be arranged close to an exit opening.

By having the inlet fan and the exhaust fan, the cooling air may effectively be conveyed towards the generator portions and away from the generator portion after having acquired some of the heat energy of the generator portions.

The arrangement may further comprise an outlet valve installed in the exhaust duct, in particular close to an exit opening. The inlet fan, the outlet fan, the valve installed in the bypass duct and also the outlet valve may be controllable depending on the temperature of the generator portions, the temperature of the ambient air, the humidity and potentially other physical quantities.

Thereby, an effective, reliable cooling of the generator may be achieved.

According to an embodiment of the present invention, the filter system is configured to substantially retain solid particles, in particular having particle size larger than 0.4 µm, from reaching the other space region when impacting thereon from the space region. Other particle size thresholds may be possible. Thereby, conventionally available filter systems may be used in arrangements according to embodiments of the present invention.

According to an embodiment of the present invention, the filter system comprises at least one fine particle filter, in particular a F7 filter or other filter types like F5, F8, F9 or E10, in particular a two stage filter.

When salt previously dissolved within the cooling air taken from outside the nacelle is dried out due to lowering the humidity of the mixed and combined cooling air, the cooling air may effectively be cleaned by providing a particle filter or one or more particle filters having different particle size thresholds.

According to an embodiment of the present invention it is provided a wind turbine, in particular direct drive wind turbine, comprising a nacelle, a generator mounted within the nacelle, and an arrangement according to one of the preceding embodiments adapted to cool the generator using ambient cooling air.

It should be understood that features individually or in any combination disclosed, described, explained or applied to an arrangement for cooling a generator mounted in a nacelle of a wind turbine may also, individually or in any combination, used for, applied or provided for a method of cooling a generator mounted in a nacelle according to embodiments of the present invention and vice versa.

According to an embodiment of the present invention it is provided a method of cooling a generator mounted in a nacelle of a wind turbine, the method comprising introducing cooling air via a cooling air inlet at an outer wall of the nacelle into a space region inside the nacelle, pressurizing the introduced cooling air within the space region using an inlet fan downstream the cooling air inlet, filtering the introduced cooling air by passing the cooling air through a filter system downstream the inlet fan into another space region inside the nacelle, (in particular exchanging a portion of a heat energy from the generator portions to the cooling air to obtain heated cooling air), and guiding, via a duct system, a portion of cooling air heated by exchange of heat from generator portions to the cooling air into the space region.

The method may for example be performed by a wind turbine controller. The method may be implemented in hardware and/or software. The method may be applied to an offshore or near-shore wind turbine. In an offshore or nearshore wind turbine, the ambient air may contain a considerable amount of salt. This salt may effectively be dried out according to embodiments of the present invention and subsequently filtered out using the filter system which may make it suitable for cooling a generator.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
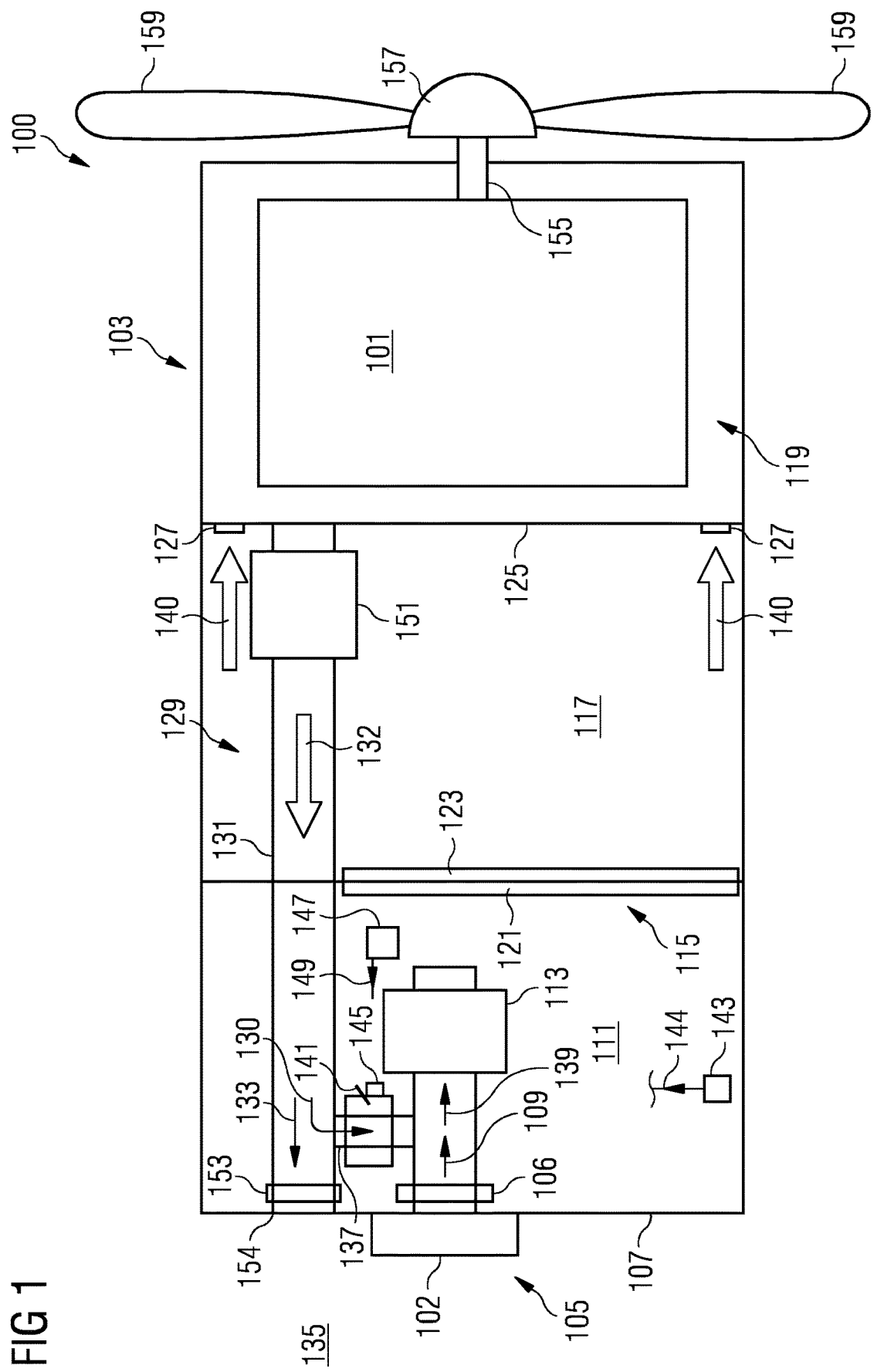
FIG. 1 schematically illustrates an arrangement for cooling a generator according to an embodiment of the present invention.

The illustration in the drawings is in schematic form. It is noted that in different figures, similar or identical elements are provided with the same reference signs or with reference signs, which are different from the corresponding reference signs only within the first digit.

The arrangement 100 for cooling a generator 101 mounted in a nacelle 103 of a wind turbine comprises a cooling air inlet 105 (and optionally a mist eliminator 102 and an inlet valve 106) at an outer wall 107 of the nacelle 103 for introducing cooling air 109 into a space region 111 (also referred to as low humidity filter room) inside the nacelle 103, as illustrated in FIG. 1. The cooling air inlet may, according to an embodiment of the present invention, provided at a bottom side of the nacelle. The arrangement 100 further comprises an inlet fan 113 downstream the cooling air inlet 105 and configured to pressurize the introduced cooling air within the space region 111. The arrangement 100 further comprises a filter system 115 downstream the inlet fan 113 and separating the space region 111 from another space region 117 being in communication with generator portions 119 to be cooled.

The filter system 115 comprises a filter array containing different filter layers 121, 123. The filter system 115 may be configured to filter out particles having a particle size larger than a threshold, such as 0.4 µm. Thus, after filtering the cooling air, a cleaned cooling air 140 will be present within the other space region 117. In a wall section 125, one or more air inlets 127 may be present which allows the cleaned cooling air 140 to reach the portions 119 of the generator 101 to be cooled.

The arrangement 100 further comprises a mixing valve 141 installed in the bypass duct 137 and controllable to adjust a valve opening, in order to adjust an amount of the portion 130 of the heated cooling air 132 guided into the space region 111.

Therefore, the duct system 129 comprises an exhaust duct 131 for guiding heated cooling air 132 away from the generator, for guiding the portion 130 of the heated cooling air 132 to the space region 111 and for guiding another portion 133 of the heated cooling air 132 to an outside 135 of the nacelle 103. The duct system 129 comprises a bypass duct 137 which is arranged to provide a communication between the exhaust duct 131 and the space region 111 such that cooling air 109 introduced into the space region 111 via the cooling air inlet 105 combines with the portion 130 of the heated cooling air 132 guided through the bypass 137 and such that the combined air 139 passes through the inlet fan 113.

The arrangement 100 further comprises a mixing valve 141 installed in the bypass duct 137 and controllable to adjust a valve opening, in order to adjust a amount of the portion 130 of the heated cooling air 132 guided into the space region 111.

The arrangement further comprises a humidity sensor 143 adapted to measure a humidity of air present within the space region 111. Further, the arrangement 100 comprises an actuator 145 which is adapted to adjust the valve opening of the mixing valve 141. Furthermore, the arrangement comprises a valve controller 147 which is adapted to generate a driving signal 149 for the actuator 145 based on the measured humidity 144 and a predetermined humidity. Thereby, the mixing valve 141 may be set such as to achieve a desired humidity within the space region 111.

The arrangement 100 further comprises an exhaust fan 151 configured to generate a pressure in the exhaust duct 131 lower than around the portion of the generator 101. The arrangement 100 further comprises an outlet valve 153 installed in the exhaust duct 131 close to an exhaust opening 154.

The filter system 115 may be adapted to retain solid particles having a particular size larger than a threshold, from reaching the other space region 117 when impacting thereon from the space region 111.

The arrangement 100 may be comprised in, in particular a nacelle of, a wind turbine having a rotor 155 and a hub 157 connected to the rotor, wherein at the hub 157, plural rotor blades 159 are mounted.

The arrangement 100 is capable of performing a method according to an embodiment of the present invention.

Figure 2:
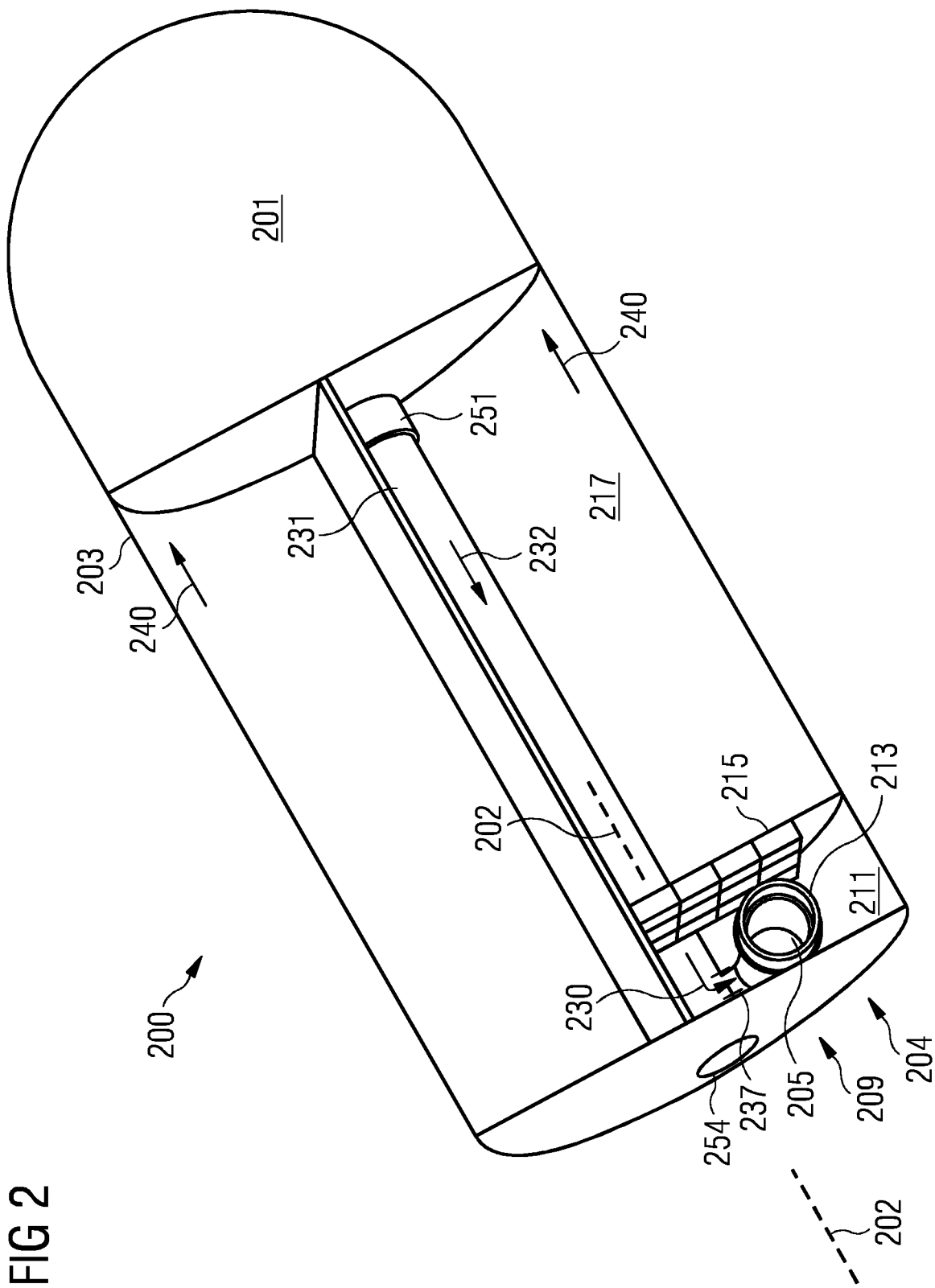
FIG. 2 schematically illustrates a partially cut-away three-dimensional view of a nacelle comprising an arrangement for cooling a generator according to an embodiment of the present invention.

FIG. 2 schematically illustrates a partially cut-away three-dimensional view of an embodiment 200 of an arrangement 200 for cooling a generator. Thereby, FIG. 2 illustrates the nacelle 203 in a schematic three-dimensional view from a top side, wherein portions are cut away such as to allow inspection of the interior of the nacelle 203.

At a bottom side 204 (lying behind the drawing plane of FIG. 2), the nacelle 203 comprises the cooling air inlet 205. The arrangement 200 comprises the inlet fan 213 and further comprises the bypass duct 237 which guides a portion 230 of heated cooling air 232 into the space region 211 (low humidity filter chamber) wherein the heated cooling air is mixed using the inlet fan with the cooling air 209 introduced via the cooling air inlet 205. The arrangement 200 further comprises the filter array 215 which filters the mixed combined air such that in the other space region 217, cleaned cooling air is present which is guided to the generator 201 for cooling. The cooling air exchanges heat with portions of the generator 201 and is guided back using the exhaust duct 231 which also comprises a not illustrated exhaust fan to convey the majority of the heated cooling air out of the nacelle via the air outlet 254.

According to embodiments of the present invention, hot air having exchanged a portion of the heat energy of the generator is mixed into the inlet air before (upstream) the fan and before the filter. Thereby, it may be possible to achieve a higher flow by using only two fans. When mixing the hot air into the cold air before the fan, it may be ensured that the air is well mixed before entering the filter room 111. In addition, the large velocities around the blade and the forceful mixing may ensure that all liquefied salt particles are dried out before entering the filter room 111. Dry salt particles may behave like ordinary dust and may thus easily be filtered using standard filter types like the F7 filter, according to an embodiment of the present invention. If a better filtering efficiency or safety is needed, a two-stage filter system may be created by using two filter walls in series. Using the inlet fan may allow to keep the pressure high in the filter room and the nacelle may ensure that dirty air does not enter the nacelle and generator.

One main idea of the present invention may be to use the inlet fan for drying out liquefied salt particles by mixing the hot bypass air with the cold salty inlet air before the fan. This may ensure that salt can be filtered away by ordinary standard filter techniques.

In the embodiments illustrated in FIGS. 1 and 2, the cooling air inlet may comprise one or more openings, for example also one opening which provides a communication to an interior of a wind turbine tower. The cooling air introduced via one or more openings may be combined in the space region 111 and may mix with the portions of the heated cooling air 137, 132 upstream of the inlet fan which is in turn upstream of the filter system.

Figure 3:
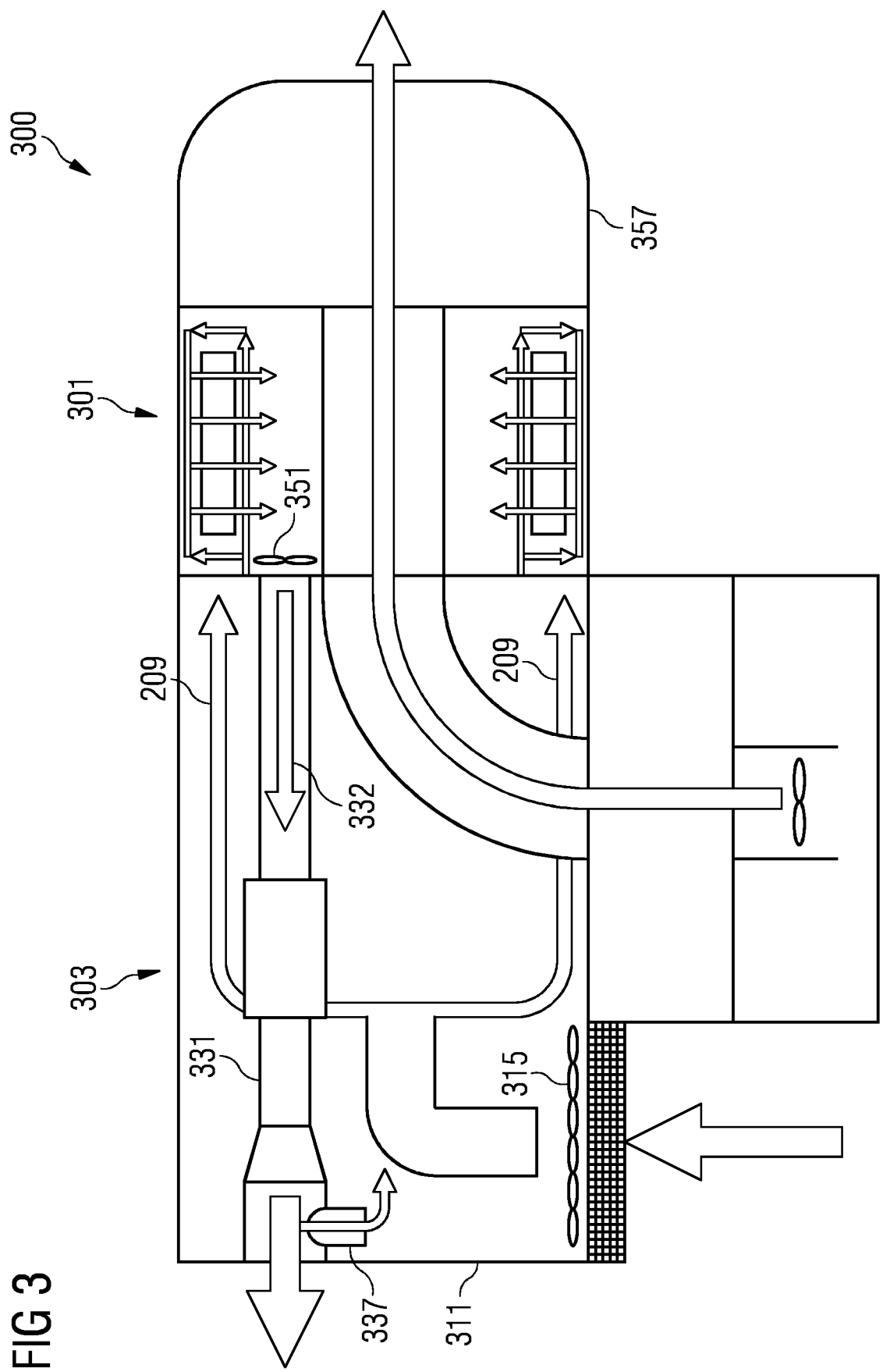
FIG. 3 schematically illustrates a cooling arrangement according to the prior art.

FIG. 3 schematically illustrates a nacelle of a wind turbine according to the prior art. The nacelle 303 also comprises a filter system 315 but this filter 315 is upstream a bypass duct 337 and also upstream of a not illustrated inlet fan.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

What is claimed is:

1. An arrangement for cooling a generator mounted in a nacelle of a wind turbine, said arrangement comprising:
   a cooling air inlet at an outer wall of the nacelle for introducing cooling air into a space region inside the nacelle;
   an inlet fan arranged downstream the cooling air inlet and configured to pressurize the introduced cooling air within the space region;
   a filter system arranged downstream the inlet fan and separating the space region from another space region inside the nacelle, said another space region being in communication with portions of the generator to be cooled; and
   a duct system structured to guide a portion of cooling air heated by exchange of heat from the generator portions to the cooling air into the space region.

2. The arrangement of claim 1, wherein the duct system comprises:
   an exhaust duct for guiding another portion of the heated cooling air to an outside of the nacelle; and
   a bypass duct arranged to provide a communication between the exhaust duct and the space region such that cooling air introduced into the space region combines with the portion of the heated cooling air guided through the bypass duct and the combined air passes through the inlet fan.

3. The arrangement of claim 2, wherein the inlet fan is configured to mix the portion of the heated cooling air with the cooling air introduced via the cooling air inlet to reduce a relative humidity of the combined cooling air, thereby forming solid salt particles.

4. The arrangement of claim 2, further comprising a valve installed in the bypass duct and controllable to adjust a valve opening, in order to adjust a magnitude of the portion of the heated cooling air guided into the space region.

5. The arrangement of claim 4, further comprising:
   a humidity sensor configured to measure a humidity of air present within the space region;
   an actuator configured to adjust the valve opening; and a valve controller configured to generate a driving signal for the actuator based on the measured humidity and a predetermined humidity between 50% and 70% to achieve the predetermined humidity thereby achieving effective drying out of salt dissolved in the cooling air introduced via the cooling air inlet.

6. The arrangement of claim 2, wherein the exhaust duct runs in a longitudinal direction of the nacelle.

7. The arrangement of claim 2, further comprising an exhaust fan configured to generate in the exhaust duct a pressure which is lower than a pressure around the generator portions.

8. The arrangement of claim 2, further comprising an outlet valve installed in the exhaust duct.

9. The arrangement of claim 1, wherein the filter system is configured to substantially retain solid particles having a particle size larger than 0.4 μm, from reaching the another space region when impacting thereon from the space region.

10. The arrangement of claim 1, wherein the filter system comprises at least one fine particle filter.

11. A wind turbine, comprising:
a nacelle;
a generator mounted within the nacelle; and
an arrangement for cooling the generator using ambient cooling air, said arrangement comprising a cooling air inlet at an outer wall of the nacelle for introducing cooling air into a space region inside the nacelle, an inlet fan arranged downstream the cooling air inlet and configured to pressurize the introduced cooling air within the space region, a filter system arranged downstream the inlet fan and separating the space region from another space region inside the nacelle, said another space region being in communication with portions of the generator, and a duct system structured to guide a portion of cooling air heated by exchange of heat from the generator portions to the cooling air into the space region.

12. The wind turbine of claim 11, wherein the duct system of the arrangement comprises an exhaust duct for guiding another portion of the heated cooling air to an outside of the nacelle, and a bypass duct arranged to provide a communication between the exhaust duct and the space region such that cooling air introduced into the space region combines with the portion of the heated cooling air guided through the bypass duct and the combined air passes through the inlet fan.

13. The wind turbine of claim 12, wherein the inlet fan of the arrangement is configured to mix the portion of the heated cooling air with the cooling air introduced via the cooling air inlet to reduce a relative humidity of the combined cooling air, thereby forming solid salt particles.

14. The wind turbine of claim 12, wherein the arrangement includes a valve installed in the bypass duct and controllable to adjust a valve opening, in order to adjust a magnitude of the portion of the heated cooling air guided into the space region.

15. The wind turbine of claim 14, wherein the arrangement includes a humidity sensor configured to measure a humidity of air present within the space region, an actuator configured to adjust the valve opening, and a valve controller configured to generate a driving signal for the actuator based on the measured humidity and a predetermined humidity between 50% and 70% to achieve the predetermined humidity thereby achieving effective drying out of salt dissolved in the cooling air introduced via the cooling air inlet.

16. The wind turbine of claim 12, wherein the exhaust duct runs in a longitudinal direction of the nacelle.

17. The wind turbine of claim 12, wherein the arrangement includes an exhaust fan configured to generate in the exhaust duct a pressure which is lower than a pressure around the generator portions.

18. The wind turbine of claim 12, wherein the arrangement includes an outlet valve installed in the exhaust duct.

19. The wind turbine of claim 11, wherein the filter system of the arrangement is configured to substantially retain solid particles having a particle size larger than 0.4 μm, from reaching the another space region when impacting thereon from the space region.

20. The wind turbine of claim 11, wherein the filter system comprises at least one fine particle filter.

21. A method of cooling a generator mounted in a nacelle of a wind turbine, said method comprising:
introducing cooling air via a cooling air inlet at an outer wall of the nacelle into a space region inside the nacelle;
pressurizing the introduced cooling air within the space region using an inlet fan downstream the cooling air inlet;
filtering the introduced cooling air by passing the cooling air through a filter system arranged downstream the inlet fan and separating the space region from another space region inside the nacelle, with the another space being in communication with portions of the generator to be cooled; and
guiding, via a duct system, a portion of cooling air heated by exchange of heat from portions of the generator to the cooling air into the space region.

22. The method of claim 21, applied to an offshore or near shore wind turbine.

* * * * *